(12) United States Patent
Yang et al.

(10) Patent No.: US 11,452,119 B2
(45) Date of Patent: Sep. 20, 2022

(54) MEASUREMENT METHOD, BASE STATION AND TERMINAL

(71) Applicant: Guangdong OPPO Mobile Telecommunications Corp., Ltd., Guangdong (CN)

(72) Inventors: Ning Yang, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 294 days.

(21) Appl. No.: 16/476,070

(22) PCT Filed: Jan. 6, 2017

(86) PCT No.: PCT/CN2017/070483
§ 371 (c)(1),
(2) Date: Jul. 3, 2019

(87) PCT Pub. No.: WO2018/126455
PCT Pub. Date: Jul. 12, 2018

(65) Prior Publication Data
US 2019/0357234 A1 Nov. 21, 2019

(51) Int. Cl.
*H04W 72/12* (2009.01)
*H04W 4/80* (2018.01)
(Continued)

(52) U.S. Cl.
CPC ....... *H04W 72/1226* (2013.01); *H04L 1/0026* (2013.01); *H04L 5/0051* (2013.01); *H04W 4/80* (2018.02); *H04W 24/10* (2013.01)

(58) Field of Classification Search
None
See application file for complete search history.

(56) References Cited

U.S. PATENT DOCUMENTS

2009/0268831 A1* 10/2009 Onggosanusi ........ H04L 5/0044
375/260
2011/0305161 A1* 12/2011 Ekpenyong .......... H04L 5/0048
370/252

(Continued)

FOREIGN PATENT DOCUMENTS

CL     2019001868 A1   10/2019
CN     102118218 A     7/2011

(Continued)

OTHER PUBLICATIONS

Extended European Search Report for EP 17890284.7 dated Nov. 18, 2019.

(Continued)

*Primary Examiner* — Shripal K Khajuria
(74) *Attorney, Agent, or Firm* — Young Basile Hanlon & MacFarlane, P.C.

(57) ABSTRACT

A measurement method, a base station and a terminal are provided. The method includes: a base station sends a switch message for a narrow bandwidth reception mode to a terminal to instruct the terminal to switch to a designated narrow bandwidth to receive information, wherein a width of the narrow bandwidth is less than a width of a system bandwidth; the base station schedules the terminal to switch to the system bandwidth to measure a downlink reference signal when channel state information of a downlink channel needs to be measured.

20 Claims, 9 Drawing Sheets

(51) Int. Cl.
    *H04L 1/00*     (2006.01)
    *H04L 5/00*     (2006.01)
    *H04W 24/10*     (2009.01)

(56) References Cited

U.S. PATENT DOCUMENTS

| | | | |
|---|---|---|---|
| 2013/0016690 A1 | 1/2013 | Jeong et al. | |
| 2013/0258897 A1 | 10/2013 | Park et al. | |
| 2013/0322363 A1* | 12/2013 | Chen | H04L 5/0053 370/329 |
| 2015/0312958 A1* | 10/2015 | Cheng | H04L 5/0048 370/252 |
| 2016/0330004 A1* | 11/2016 | Kim | H04L 5/0048 |
| 2018/0034608 A1* | 2/2018 | Seo | H04L 5/0048 |
| 2018/0069612 A1* | 3/2018 | Yum | H04L 1/0026 |
| 2019/0036738 A1* | 1/2019 | Miao | H04L 25/02 |

FOREIGN PATENT DOCUMENTS

| | | |
|---|---|---|
| CN | 102237958 A | 11/2011 |
| CN | 102237985 A | 11/2011 |
| CN | 103067945 A | 4/2013 |
| CN | 104321985 A | 1/2015 |
| CN | 104380820 A | 2/2015 |
| JP | 2014-531856 A | 11/2014 |
| RU | 2011104354 A | 9/2012 |
| RU | 2549365 C2 | 4/2015 |
| RU | 2014132695 A | 3/2016 |
| WO | 2013112972 A1 | 8/2013 |
| WO | 2016117643 A1 | 7/2016 |
| WO | 2016163819 A1 | 10/2016 |

OTHER PUBLICATIONS

3GPP TSG-RAN WG1 #87; Reno, USA; Nov. 14-18, 2016; R1-1612315.
3GPP TSG RAN WG1 Meeting #87; Reno, USA; Nov. 14-18, 2016; R1-1613554.
India First Examination Report for IN Application 201917028758 dated Dec. 11, 2020.
Japan First Office Action with English Translation for JP Application 2019536906 dated Dec. 21, 2020.
3GPP TSG RAN WG1 Meeting #87; Reno, USA, Nov. 14-18, 2016; R1-1611655.
EP Examination for EP Application 17890284.7 dated Jul. 17, 2020.
English translation of the Russia Decision on Grant for RU Application 2019124268/07(047380) dated May 28, 2020.
Canada OA for CA Application 3,049,282 mailed Aug. 12, 2020.
English translation of the Chili Office Action for CL Application 1660605.
Australian Examination Report for AU Application 2017391826 dated Aug. 27, 2021. (4 pages).
Indonesia Office Action with English Translation for ID Application P00201906734 dated Jul. 8, 2021. (4 pages).
Israel Office Action with English Translation for IL Application 267827 dated Aug. 1, 2021. (9 pages).
Taiwan Office Action with English Translation for TW Application 106146417 dated Jun. 21, 2021. (9 pages).
Extended European Search Report for EP Application 21185222.3 dated Oct. 6, 2021. (7 pages).
Japanese Decision to Grant a Patent with English Translation for JP Application 2019536906 dated Oct. 1, 2021 (5 pages).

\* cited by examiner

MEASUREMENT METHOD, BASE STATION AND TERMINAL

CROSS-REFERENCE TO RELATED APPLICATION(S)

This application is a 371 application of International Application No. PCT/CN2017/070483, filed on Jan. 6, 2017, the entire disclosure of which is hereby incorporated by reference.

TECHNICAL FIELD

The present disclosure relates to the technical field of communication, in particular to a measurement method, a base station, and a terminal.

BACKGROUND

In a Long Term Evolution (LTE) system, a terminal receives downlink signals over an entire system bandwidth. The downlink signals include Physical Downlink Control Channel (PDCCH) and downlink common reference signals such as Cell-specific Reference Signal (CRS) and channel state information reference signal (CSI-RS). The LTE system supports System bandwidths of 1.4 MHz, 3 MHz, 5 MHz, 10 MHz, 15 MHz, and 20 MHz. Among them, typical and widely used system bandwidths are 20 MHz and 10 MHz, which correspond to 100 Physical Resource Blocks (PRB) and 50 PRBs respectively on a downlink channel.

In an existing LTE system, a terminal will always blindly detect PDCCH over the entire downlink system bandwidth, which will lead to a higher power consumption of the terminal. Especially in a 5-Generation (5G) mobile communication technology system and subsequent mobile communication technology systems with larger bandwidth, a bandwidth of a carrier may be very wide, for example up to 200 MHz. If the terminal still receives PDCCH on a full bandwidth as in the LTE system, i.e., a 4-Generation (4G) mobile communication technology system, the power consumption of the terminal will be very high. For a terminal supporting Machine Type Communications (MTC), downlink signals may be demodulated at a bandwidth of 1.4 MHz, that is, a bandwidth of 6 PRBs. For this type of terminal, power consumption of the terminal may be saved due to a reduction of downlink bandwidth. However, since such a terminal may only work on a narrow bandwidth, such as on 6 PRBs, functions of the terminal will be greatly limited. For example, in a cellular system, a terminal needs to measure Channel State Information (CSI) of a downlink channel and feed it back to a base station. The base station will use the CSI fed back by the terminal as an important basis for scheduling downlink data. The measurement for CSI of the downlink channel by the terminal is generally accomplished by measuring a downlink reference signal such as CRS or CSI-RS. Since these two downlink reference signals are transmitted by the base station over the entire system bandwidth and it is difficult to obtain accurate CSI of the downlink channel, it is necessary to solve a problem of measuring the CSI of the downlink channel by the terminal operating over the narrow bandwidth.

SUMMARY

Implementations of the present disclosure provide a measurement method, a base station, and a terminal.

A first aspect of implementations of the present disclosure provides a measurement method, including: sending, by a base station, a switch message for a narrow bandwidth reception mode to a terminal, to instruct the terminal to switch to a designated narrow bandwidth to receive information, wherein a width of the narrow bandwidth is less than a width of a system bandwidth; and scheduling, by the base station, the terminal to switch to the system bandwidth to measure a downlink reference signal when channel state information of a downlink channel needs to be measured.

In one possible implementation, the measurement method further includes: sending downlink control information for the terminal in a physical downlink control channel on the narrow bandwidth; wherein the downlink control information is in a terminal specific search space corresponding to the terminal and uses a control channel element aggregation level corresponding to the terminal.

In one possible implementation, the scheduling, by the base station, the terminal to switch to the system bandwidth to measure the downlink reference signal when the channel state information of the downlink channel needs to be measured, includes: configuring, by the base station, measurement parameters for the terminal to measure the downlink reference signal and sending the measurement parameters to the terminal, wherein the measurement parameters include a cycle for the terminal to measure the downlink reference signal and information of a time period for the terminal to measure the downlink reference signal in the cycle, wherein the cycle includes a duration for the terminal to enter the narrow bandwidth reception mode, switch to a system bandwidth to measure the downlink reference signal, and enter the narrow bandwidth reception mode again; and scheduling the terminal to switch to the system bandwidth to measure the downlink reference signal according to the measurement parameters.

In one possible implementation, before scheduling the terminal to switch to the system bandwidth to measure the downlink reference signal according to the measurement parameters, the method further includes: sending a trigger signal on a physical downlink control channel of the narrow bandwidth, wherein the trigger signal is used for triggering the terminal to switch to the system bandwidth to measure the downlink reference signal according to the measurement parameters.

In one possible implementation, the scheduling, by the base station, the terminal to switch to the system bandwidth to measure the downlink reference signal when the channel state information of the downlink channel needs to be measured, includes: configuring, by the base station, measurement parameters for the terminal to measure the downlink reference signal and sending the measurement parameters to the terminal, wherein the measurement parameters include a duration for the terminal to measure the downlink reference signal for one time; and sending a trigger signal on a physical downlink control channel of the narrow bandwidth, wherein the trigger signal is used for triggering the terminal to switch to the system bandwidth to measure the downlink reference signal according to the measurement parameters.

In one possible implementation, the measurement parameters configured by the base station for the terminal include at least two different configurations, and when the measurement parameters are sent to the terminal, configuration situations of the measurement parameters are indicated to the terminal through a physical downlink control channel of the narrow bandwidth; and the base station instructs the terminal to use measurement parameters of another configuration for measurement through the physical downlink control channel of the narrow bandwidth if currently used measurement parameters need to be modified.

In one possible implementation, the measurement method further includes: receiving the channel state information of the downlink channel reported by the terminal; and sending a message for stopping measurement to the terminal, to instruct the terminal to stop measuring the downlink reference signal.

A second aspect of implementations of the present disclosure provides a measurement method, including: receiving, by a terminal, a switch message for a narrow bandwidth reception mode sent by a base station and switching to a designated narrow bandwidth to receive information, wherein a width of the narrow bandwidth is less than a width of a system bandwidth; and switching to the system bandwidth to measure a downlink reference signal according to scheduling of the base station when channel state information of a downlink channel needs to be measured.

In one possible implementation, the measurement method further includes: receiving downlink control information for the terminal in a physical downlink control channel on the narrow bandwidth; wherein the downlink control information is in a terminal specific search space corresponding to the terminal and uses a control channel element aggregation level corresponding to the terminal.

In one possible implementation, the switching to the system bandwidth to measure the downlink reference signal according to the scheduling of the base station when the channel state information of the downlink channel needs to be measured, includes: receiving measurement parameters configured by the base station for the terminal to measure the downlink reference signal, wherein the measurement parameters include a cycle for the terminal to measure the downlink reference signal and information of a time period for the terminal to measure the downlink reference signal in the cycle, wherein the cycle includes a duration for the terminal to enter the narrow bandwidth reception mode, switch to a system bandwidth to measure the downlink reference signal, and enter the narrow bandwidth reception mode again; and switching to the system bandwidth to measure the downlink reference signal according to the measurement parameters.

In one possible implementation, before switching to the system bandwidth to measure the downlink reference signal according to the measurement parameters, the method further includes: receiving a trigger signal sent by the base station on a physical downlink control channel of the narrow bandwidth, wherein the trigger signal is used for triggering the terminal to switch to the system bandwidth to measure the downlink reference signal according to the measurement parameters.

In one possible implementation, the switching to the system bandwidth to measure the downlink reference signal according to the scheduling of the base station when the channel state information of the downlink channel needs to be measured, includes: receiving measurement parameters configured by the base station for the terminal to measure the downlink reference signal, wherein the measurement parameters include a duration for the terminal to measure the downlink reference signal for one time; receiving a trigger signal sent by the base station on a physical downlink control channel of the narrow bandwidth; and switching to the system bandwidth to measure the downlink reference signal according to the trigger signal and the measurement parameters.

In one possible implementation, the measurement parameters configured by the base station for the terminal include at least two different configurations, and when receiving the measurement parameters, configuration situations of the measurement parameters are determined through an indication on a physical downlink control channel of the narrow bandwidth; and receiving information, which is sent by the base station through the physical downlink control channel of the narrow bandwidth, instructing the terminal to use measurement parameters of another configuration for measurement if the base station needs to modify currently used measurement parameters.

In one possible implementation, the measurement method further includes: reporting the channel state information of the downlink channel to the base station; and receiving a message for stopping measurement sent by the base station, and stopping measuring the downlink reference signal.

A third aspect of implementations of the present disclosure provides a base station, including: a sending unit, used for sending a switch message for a narrow bandwidth reception mode to a terminal, to instruct the terminal to switch to a designated narrow bandwidth to receive information, wherein a width of the narrow bandwidth is less than a width of a system bandwidth; and a scheduling unit, used for scheduling the terminal to switch to the system bandwidth to measure a downlink reference signal when channel state information of a downlink channel needs to be measured.

In one possible implementation, the sending unit is further used for sending downlink control information for the terminal in a physical downlink control channel on the narrow bandwidth; wherein the downlink control information is in a terminal specific search space corresponding to the terminal and uses a control channel element aggregation level corresponding to the terminal.

In one possible implementation, the scheduling unit is specifically used for: configuring measurement parameters for the terminal to measure the downlink reference signal and sending the measurement parameters to the terminal, wherein the measurement parameters include a cycle for the terminal to measure the downlink reference signal and information of a time period for the terminal to measure the downlink reference signal in the cycle, wherein the cycle includes a duration for the terminal to enter the narrow bandwidth reception mode, switch to a system bandwidth to measure the downlink reference signal, and enter the narrow bandwidth reception mode again; and scheduling the terminal to switch to the system bandwidth to measure the downlink reference signal according to the measurement parameters.

In one possible implementation, before scheduling the terminal to switch to the system bandwidth to measure the downlink reference signal according to the measurement parameters, the sending unit is further used for sending a trigger signal on a physical downlink control channel of the narrow bandwidth, wherein the trigger signal is used for triggering the terminal to switch to the system bandwidth to measure the downlink reference signal according to the measurement parameters.

In one possible implementation, the scheduling unit is specifically used for: configuring measurement parameters for the terminal to measure the downlink reference signal and sending the measurement parameters to the terminal, wherein the measurement parameters include a duration for the terminal to measure the downlink reference signal for one time; and sending a trigger signal on a physical downlink control channel of the narrow bandwidth, wherein the trigger signal is used for triggering the terminal to switch to the system bandwidth to measure the downlink reference signal according to the measurement parameters.

In one possible implementation, the measurement parameters configured by the base station for the terminal include at least two different configurations, and the sending unit is further used for indicating configuration situations of the measurement parameters to the terminal through a physical downlink control channel of the narrow bandwidth when sending the measurement parameters to the terminal; and the scheduling unit is further used for instructing the terminal to use measurement parameters of another configuration for measurement through the physical downlink control channel of the narrow bandwidth if currently used measurement parameters need to be modified.

In one possible implementation, the scheduling unit is further used for receiving the channel state information of the downlink channel reported by the terminal; and sending a message for stopping measurement to the terminal, to instruct the terminal to stop measuring the downlink reference signal.

A fourth aspect of implementations of the present disclosure provides a base station including: a processor, a memory, a transceiver, and a bus, wherein the processor, the memory and the transceiver are connected through the bus, and the transceiver is used for receiving and transmitting signals and communicating with a terminal, and the memory is used for storing a group of program codes, and the processor is used for calling the program codes stored in the memory to perform the following operations: sending a switch message for a narrow bandwidth reception mode to a terminal through the transceiver, to instruct the terminal to switch to a specified narrow bandwidth to receive information, wherein a width of the narrow bandwidth is less than a width of a system bandwidth; and scheduling, by the base station, the terminal to switch to the system bandwidth to measure a downlink reference signal when channel state information of a downlink channel needs to be measured.

In one possible implementation, the processor is further used for sending downlink control information for the terminal through the transceiver in a physical downlink control channel on the narrow bandwidth; wherein the downlink control information is in a terminal specific search space corresponding to the terminal and uses a control channel element aggregation level corresponding to the terminal.

In one possible implementation, the processor is specifically used for configuring measurement parameters for the terminal to measure the downlink reference signal and sending the measurement parameters to the terminal, wherein the measurement parameters include a cycle for the terminal to measure the downlink reference signal and information of a time period for the terminal to measure the downlink reference signal in the cycle, wherein the cycle includes a duration for the terminal to enter the narrow bandwidth reception mode, switch to a system bandwidth to measure the downlink reference signal, and enter the narrow bandwidth reception mode again; and scheduling the terminal to switch to the system bandwidth to measure the downlink reference signal according to the measurement parameters.

In one possible implementation, before scheduling the terminal to switch to the system bandwidth to measure the downlink reference signal according to the measurement parameters, the processor is further used for: sending a trigger signal through the transceiver on a physical downlink control channel of the narrow bandwidth, wherein the trigger signal is used for triggering the terminal to switch to the system bandwidth to measure the downlink reference signal according to the measurement parameters.

In one possible implementation, the processor is specifically used for configuring measurement parameters for the terminal to measure the downlink reference signal and sending the measurement parameters to the terminal, wherein the measurement parameters include a duration for the terminal to measure the downlink reference signal for one time; and sending a trigger signal on a physical downlink control channel of the narrow bandwidth, wherein the trigger signal is used for triggering the terminal to switch to the system bandwidth to measure the downlink reference signal according to the measurement parameters.

In one possible implementation, the measurement parameters configured by the base station for the terminal include at least two different configurations, and the processor is further used for indicating configuration situations of the measurement parameters to the terminal through a physical downlink control channel of the narrow bandwidth when sending the measurement parameters to the terminal; and the processor is further used for instructing the terminal to use measurement parameters of another configuration for measurement through the physical downlink control channel of the narrow bandwidth if currently used measurement parameters need to be modified.

In one possible implementation, the processor is further used for receiving the channel state information of the downlink channel reported by the terminal through the transceiver; and sending a message for stopping measurement to the terminal, to instruct the terminal to stop measuring the downlink reference signal.

A fifth aspect of implementations of the present disclosure provides a terminal, including: a receiving unit, used for receiving a switch message for a narrow bandwidth reception mode sent by a base station and switching to a designated narrow bandwidth to receive information, wherein a width of the narrow bandwidth is less than a width of a system bandwidth; and a switching unit, used for switching to the system bandwidth to measure a downlink reference signal according to scheduling of the base station when channel state information of a downlink channel needs to be measured.

In one possible implementation, the receiving unit is further used for receiving downlink control information for the terminal in a physical downlink control channel on the narrow bandwidth; wherein the downlink control information is in a terminal specific search space corresponding to the terminal and uses a control channel element aggregation level corresponding to the terminal.

In one possible implementation, the receiving unit is specifically used for receiving measurement parameters configured by the base station for the terminal to measure the downlink reference signal, wherein the measurement parameters include a cycle for the terminal to measure the downlink reference signal and information of a time period for the terminal to measure the downlink reference signal in the cycle, wherein the cycle includes a duration for the terminal to enter the narrow bandwidth reception mode, switch to a system bandwidth to measure the downlink reference signal, and enter the narrow bandwidth reception mode again; and the switching unit is specifically used for: switching to the system bandwidth to measure the downlink reference signal according to the measurement parameters.

In one possible implementation, before the switching unit switches to the system bandwidth to measure the downlink reference signal according to the measurement parameters, the receiving unit is further used for: receiving a trigger signal sent by the base station on a physical downlink control channel of the narrow bandwidth, wherein the trigger signal is used for triggering the terminal to switch to the system bandwidth to measure the downlink reference signal according to the measurement parameters.

In one possible implementation, the receiving unit is specifically used for: receiving measurement parameters configured by the base station for the terminal to measure the downlink reference signal, wherein the measurement parameters include a duration for the terminal to measure the downlink reference signal for one time; and receiving a trigger signal sent by the base station on a physical downlink control channel of the narrow bandwidth; and the switching unit is specifically used for: switching to the system bandwidth to measure the downlink reference signal according to the trigger signal and the measurement parameters.

In one possible implementation, the measurement parameters configured by the base station for the terminal include at least two different configurations, and when the receiving unit receives the measurement parameters, the switching unit is further used for determining configuration situations of the measurement parameters through an indication on a physical downlink control channel of the narrow bandwidth; and if the base station needs to modify currently used measurement parameters, the receiving unit is further used for receiving information, which is sent by the base station through the physical downlink control channel of the narrow bandwidth, instructing the terminal to use measurement parameters of another configuration for measurement.

In one possible implementation, the switching unit is further used for reporting the channel state information of the downlink channel to the base station; receiving a message for stopping measurement sent by the base station, and stopping measuring the downlink reference signal.

A sixth aspect of implementations of the present disclosure provides a terminal, including: a processor, a memory, a transmitter, a receiver, and a bus, wherein the processor, the memory, the transmitter, and the receiver are connected through the bus, wherein the transmitter is used for transmitting signals, and the receiver is used for receiving signals, and the transmitter and the receiver are independently respectively set or integrated, and the memory is used for storing a group of program codes, and the processor is used for calling the program codes stored in the memory to perform the following operations: receiving a switch message for a narrow bandwidth reception mode sent by a base station through the receiver, and switching to a designated narrow bandwidth to receive information, wherein a width of the narrow bandwidth is less than a width of a system bandwidth; and switching to the system bandwidth to measure a downlink reference signal according to scheduling of the base station when channel state information of a downlink channel needs to be measured.

In one possible implementation, the processor is further used for receiving, through the receiver, downlink control information for the terminal in a physical downlink control channel on the narrow bandwidth; wherein the downlink control information is in a terminal specific search space corresponding to the terminal and uses a control channel element aggregation level corresponding to the terminal.

In one possible implementation, the processor is specifically used for receiving, through the receiver, measurement parameters configured by the base station for the terminal to measure the downlink reference signal, wherein the measurement parameters include a cycle for the terminal to measure the downlink reference signal and information of a time period for the terminal to measure the downlink reference signal in the cycle, wherein the cycle includes a duration for the terminal to enter the narrow bandwidth reception mode, switch to a system bandwidth to measure the downlink reference signal, and enter the narrow bandwidth reception mode again; and switching to the system bandwidth to measure the downlink reference signal according to the measurement parameters.

In one possible implementation, the processor is further used for receiving, through the receiver, a trigger signal sent by the base station on a physical downlink control channel of the narrow bandwidth before switching to the system bandwidth to measure the downlink reference signal according to the measurement parameters, wherein the trigger signal is used for triggering the terminal to switch to the system bandwidth to measure the downlink reference signal according to the measurement parameters.

In one possible implementation, the processor is specifically used for: receiving, through the receiver, measurement parameters configured by the base station for the terminal to measure the downlink reference signal, wherein the measurement parameters include a duration for the terminal to measure the downlink reference signal for one time; receiving a trigger signal sent by the base station on a physical downlink control channel of the narrow bandwidth through the receiver; and switching to the system bandwidth to measure the downlink reference signal according to the trigger signal and the measurement parameters.

In one possible implementation, the measurement parameters configured by the base station for the terminal include at least two different configurations, and the processor is further used for determining configuration situations of the measurement parameters through an indication on a physical downlink control channel of the narrow bandwidth when receiving the measurement parameters; and if the base station needs to modify currently used measurement parameters, the processor is further used for receiving, through the receiver, information, which is sent by the base station through the physical downlink control channel of the narrow bandwidth, instructing the terminal to use measurement parameters of another configuration for measurement.

In one possible implementation, the processor is further used for reporting the channel state information of the downlink channel to the base station through the transmitter; receiving a message for stopping measurement sent by the base station through the receiver, and stopping measuring the downlink reference signal.

A seventh aspect of implementations of the present disclosure provides a computer storage medium including a group of program codes for executing the method according to any of the implementations of the first aspect of the implementation of the present disclosure.

An eighth aspect of implementations of the present disclosure provides a computer storage medium including a group of program codes for executing the method according to any of the implementations of the second aspect of the implementation of the present disclosure.

BRIEF DESCRIPTION OF DRAWINGS

In order to explain technical schemes of the implementations of the present disclosure or the related art more clearly, drawings required to be used in the implementations will be briefly introduced below. Obviously, the drawings in the following description are only some implementations of the present disclosure. For those of ordinary skill in the art, other drawings may be obtained according to those drawings without paying an inventive effort.

DETAILED DESCRIPTION

The terms "including" and "having" and any variations thereof in the description and claims of the present disclosure and the above drawings are intended to cover non-exclusive inclusion. For example, a process, a method, a system, a product, or an apparatus that includes a series of acts or units is not limited to the listed acts or units, but may optionally further include acts or units not listed, or may optionally further include other acts or units inherent to these processes, methods, products, or apparatuses.

With continuous improvement of people's communication demands, communication technologies are developing rapidly, which may provide users with greater bandwidth, faster uplink and downlink transmission speed, etc. For example, in a 5G system, a system bandwidth of up to 200 MHz may be provided. However, with an expansion of the system bandwidth, if a terminal receives a PDCCH over a relatively large system bandwidth, power consumption of the terminal is relatively high. If the terminal works at a relatively narrow bandwidth all the time, the system performance will be affected, resulting in that the terminal cannot normally measure CSI of a downlink channel, thus affecting transmissions of downlink data. Therefore, an implementation of the present disclosure provides a measurement method, so that the terminal may switch to a narrow bandwidth less than the system bandwidth to work, thereby saving the power consumption of the terminal, and the terminal may switch to the system bandwidth to measure a downlink reference signal when CSI of a downlink channel needs to be measured, thereby obtaining the CSI of the downlink channel. For convenience of explanation, in the implementation of the present disclosure, a 5G system is taken as an example for description. Those skilled in the art should understand that the implementation in the implementation of the present disclosure may also be applied to existing communication systems and future higher-level communication systems such as 6G and 7G. The implementation of the present disclosure is not limited thereto.

The measurement method and device of implementations of the present disclosure will be described in detail below with reference to the attached drawings.

Figure 1:
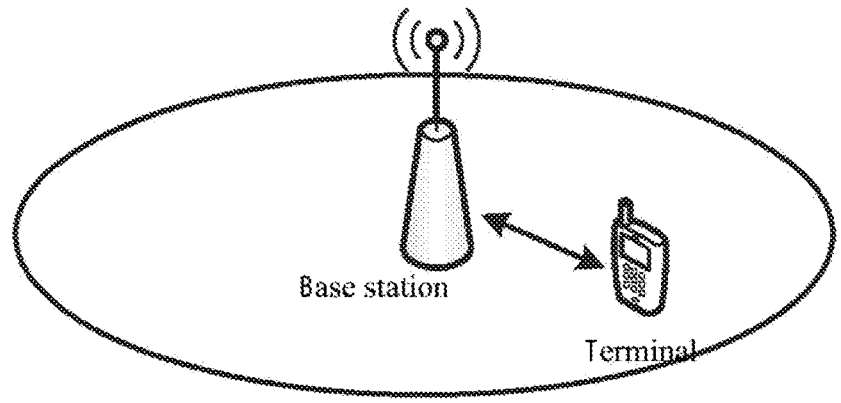
FIG. 1 is a schematic structural diagram of a communication system in an implementation of the present disclosure.

Referring to FIG. 1, which is a schematic diagram of a communication system in an implementation of the present disclosure. It may include a base station and at least one terminal, which may also be referred to as User Equipment (UE).

The base station may be an evolved Node B (eNB), a Node B (NB), a Base Station Controller (BSC), a Base Transceiver Station (BTS), a Home evolved NodeB or Home Node B (HNB), a BaseBand Unit (BBU), etc. It may also be referred to by those skilled in the art as a base station transceiver, a wireless base station, a wireless transceiver, a transceiver function, a Base Station Sub system (BSS), or some other suitable terminology. It may carry and schedule downlink control information in a PDCCH, which may specifically include a transmission format, resource allocation, uplink scheduling permission, power control, uplink retransmission information, etc. And the base station may transmit downlink data of a service to a UE, receive a retransmission feedback of the terminal and the like. The base station may schedule the terminal to work in a narrow bandwidth working mode, or may schedule the terminal to switch between a narrow bandwidth and a system bandwidth. When CSI of a downlink channel needs to be measured, the base station may schedule the terminal to switch to the system bandwidth to measure a downlink reference signal.

The terminal may include a cellular phone, a smart phone, a Session Initiation Protocol (SIP) phone, a laptop computer, a Personal Digital Assistant (PDA), a satellite radio, a global positioning system, a multimedia device, a video device, a digital audio player (e.g., MP3 player), a camera, a game console, or any other device with similar functions. Terminals may be referred to by those skilled in the art as mobile stations, subscriber stations, mobile units, subscriber units, wireless units, remote units, mobile devices, wireless devices, wireless communication devices, remote devices, mobile subscriber stations, access terminals, mobile terminals, wireless terminals, remote terminals, handheld devices, user agents, mobile clients, clients, or some other suitable terminology. The terminal may receive control information configured by the base station and time-frequency domain resources scheduled by the base station to transmit uplink service data and retransmission feedback information. The terminal may switch between a narrow bandwidth and a system bandwidth according to scheduling of the base station. A measurement for CSI of a downlink channel may be realized.

In order to reduce the power consumption of the terminal, the terminal may be configured to work in a narrow bandwidth less than a system bandwidth in the implementation of the present disclosure, and the measurement method of the present disclosure will be described in detail below with reference to FIGS. 2-9.

Figure 2:
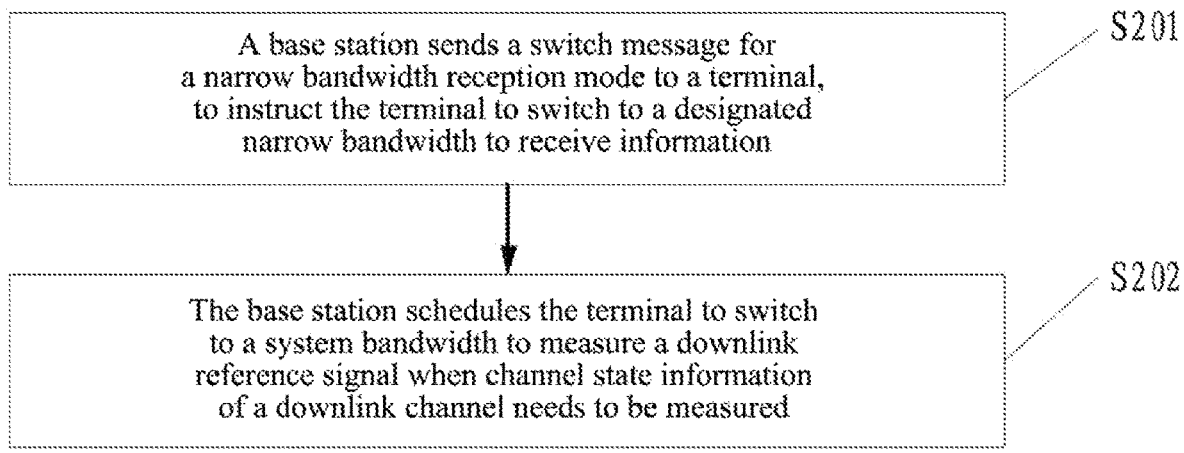
FIG. 2 is a flow chart of a first implementation of the measurement method of the present disclosure.

Referring to FIG. 2, which is a flow chart of the first implementation of the measurement method of the present disclosure. In the implementation, the measurement method includes acts S201 and S202.

In S201, a base station sends a switch message for a narrow bandwidth reception mode to a terminal, to instruct the terminal to switch to a designated narrow bandwidth to receive information.

A width of the narrow bandwidth is less than a width of a system bandwidth. The switch message may include indication of time at which the terminal enters the narrow bandwidth reception mode and a position of the narrow bandwidth on a frequency band when entering the narrow bandwidth reception mode.

Optionally, the time of entering the narrow bandwidth reception mode may include starting time of entering the narrow bandwidth reception mode. After receiving the switch message, the terminal enters the narrow bandwidth reception mode at the specified starting time until switching to the system bandwidth when receiving a message from the base station for stopping the narrow bandwidth reception mode; or it may switch from a current narrow bandwidth to another narrow bandwidth or the system bandwidth when receiving a message for switching to another narrow bandwidth or the system bandwidth sent by the base station.

In addition to the starting time of entering the narrow bandwidth reception mode, the time of entering the narrow bandwidth reception mode may optionally include termination time of entering the narrow bandwidth reception mode. The terminal may enter the narrow bandwidth reception mode at specified starting time and switch back to the system bandwidth at specified termination time to receive information.

Optionally, the base station may instruct the terminal to switch to a mode of receiving only narrow bandwidths through a high layer signaling, such as a Radio Resource Control (RRC) or physical layer signaling, such as DCI. The base station may indicate to the terminal a specific moment when the narrow bandwidth reception mode starts and a specific position of the narrow bandwidth on a frequency band. In this way, the terminal may switch to a designated narrow bandwidth to receive information according to the switch message. In the narrow bandwidth reception mode, the terminal may retune its own radio frequency bandwidth to a specified narrow bandwidth, which is a frequency domain width indicated by a system, and the terminal only performs reception on the frequency domain width indicated by the system. For example, if the narrow bandwidth indicated by the base station to the terminal is 6 PRBs (taking a subcarrier spacing of 15 KHz as an example, it is 1.4 MHz), the terminal will tune its radio frequency bandwidth to be on the 6 PRBs of the position of the narrow bandwidth on a frequency band indicated by the system. At this time, the terminal may only receive signals on the 6 PRBs. Due to a reduction of received radio frequency bandwidth, an effect of saving the electricity of the terminal may be obtained. The terminal does not need to detect signals on a wider system bandwidth, but only needs to receive signals and detect signals on a narrow bandwidth less than the system bandwidth, thus reducing a workload of the terminal, reducing the power consumption of the terminal and improving an efficiency of receiving signals by the terminal It should be noted that, for terminals supporting Machine Type Communications (MTC), downlink signals may be demodulated at a bandwidth of 1.4 MHz, that is, a bandwidth of 6 PRBs. For this type of terminal, the power consumption of the terminal may be saved as the downlink bandwidth becomes smaller. However, since such terminal may only work on a narrow bandwidth, such as on 6 PRBs, functions of the terminal will be greatly limited. The width of the narrow bandwidth in the implementation of the present disclosure is less than the width of the system bandwidth, that is, the narrow bandwidth in the implementation of the present disclosure refers to a width in a frequency domain less than the system bandwidth, which is different from the bandwidth of 1.4 MHz in the existing 4G system. For example, typical system bandwidths in the existing 4G system are 10 MHz and 20 MHz. When the system bandwidth is 10 MHz, the narrow bandwidth in the implementation of the present disclosure may be less than bandwidth of 10 MHz such as 2 MHz, 5 MHz. When the system bandwidth is 20 MHz, the narrow bandwidth in the implementation of the present disclosure may be less than bandwidth of 20 MHz such as 5 MHz, 10 MHz, and 12 MHz. When the system bandwidth is 1.4 MHz, the narrow bandwidth in the implementation of the present disclosure may be less than bandwidth of 1.4 MHz such as 0.6 MHz. For a 5G system with larger bandwidth, the narrow bandwidth may be less than the system bandwidth in the 5G system.

Since the power consumption of the terminal is mainly reflected in two aspects, in the first aspect, the terminal detects signals over the entire system bandwidth; in the second aspect, the terminal performs blind detection on a PDCCH, the blind detection on the PDCCH includes detections of different control channel element aggregation levels, such as 2, 4, 8, and different DCI lengths and the like. The DCI detected by the terminal includes DCI only for a single terminal, which needs to be detected in a UE specific search space, and DCI for multiple terminals, which needs to be detected in a common search space. Due to the large number of detected contents, the power consumption of the terminal is also high. At this time, downlink control information for the terminal may be transmitted in the physical downlink control channel on the narrow bandwidth.

The downlink control information is in a terminal specific search space corresponding to the terminal and uses a control channel element aggregation level corresponding to the terminal.

In the narrow bandwidth reception mode, the PDCCH used by the base station to schedule the terminal is on the narrow bandwidth indicated by the base station. In order to reduce a complexity of the terminal receiving such PDCCH, the PDCCH on the narrow bandwidth may carry DCI for single different terminals, but does not contain DCI for all terminals on the narrow bandwidth; in other words, PDCCH on the narrow bandwidth only contains a UE specific search space and does not contain a common search space. Meanwhile, for the DCI of the single different terminals, the control channel element aggregation level of the DCI may be fixed, for example, when the base station configures a narrow bandwidth reception mode for the terminal, it may specify to the terminal what the control channel element aggregation level of the DCI is.

Since the PDCCH only contains the UE specific search space and the fixed control channel element aggregation level, an amount of information that the terminal needs to detect when receiving the PDCCH on the narrow bandwidth may be reduced, thus further reducing the power consumption of the terminal.

In S202, the base station schedules the terminal to switch to a system bandwidth to measure a downlink reference signal when channel state information of a downlink channel needs to be measured.

For the terminal in the narrow bandwidth reception mode, the base station may instruct the terminal to measure a downlink reference signal at a specified time, or instruct the terminal to periodically tune to the system bandwidth to measure a downlink reference signal, such as CRS and/or CSI-RS. The base station may configure CRS and/or CSI-RS related parameters for the terminal in advance, such as time-frequency resources of CRS and/or CSI-RS, sequence parameters used for CRS and/or CSI-RS signals. Then CSI of the downlink channel is obtained according to the measurement result and reported to the base station. It provides a reference for the base station to schedule downlink data. A balance between the power consumption of the terminal and system performance is realized.

Figure 3:
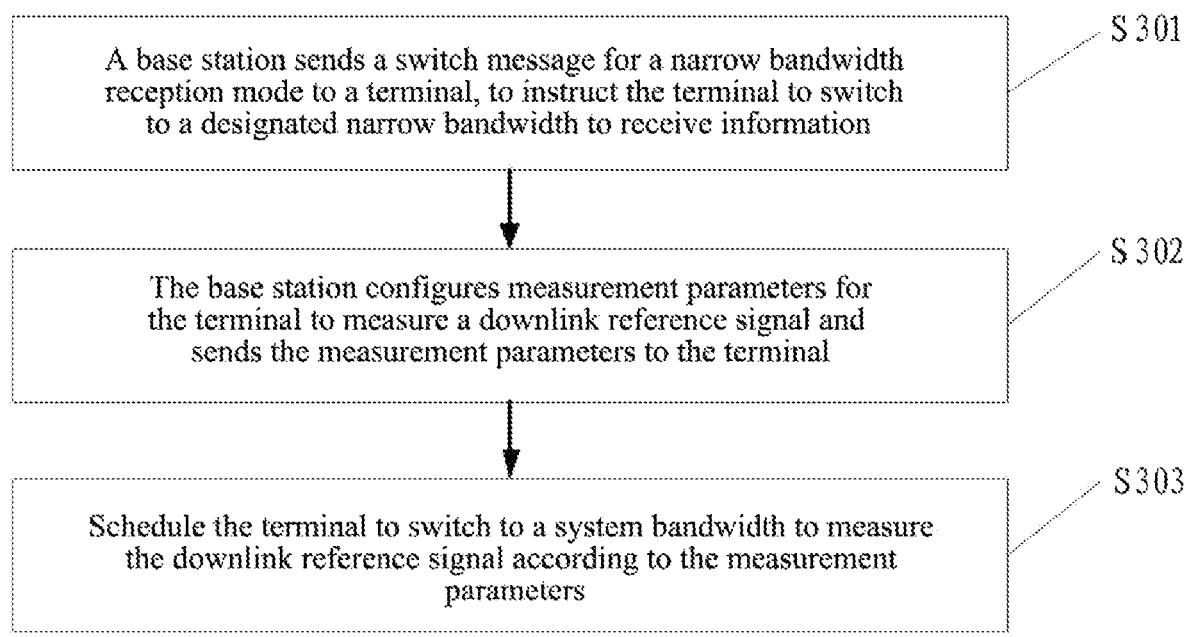
FIG. 3 is a flow chart of a second implementation of the measurement method of the present disclosure.

Referring to FIG. 3, which is a flow chart of a second implementation of the measurement method of the present disclosure. In this implementation, the method includes acts S301-S303.

In S301, a base station sends a switch message for a narrow bandwidth reception mode to a terminal, to instruct the terminal to switch to a designated narrow bandwidth to receive information.

In S302, the base station configures measurement parameters for the terminal to measure a downlink reference signal and sends the measurement parameters to the terminal.

Optionally, the measurement parameters include a cycle for the terminal to measure the downlink reference signal and information of a time period for the terminal to measure the downlink reference signal in the cycle.

The cycle includes durations for the terminal entering the narrow bandwidth reception mode, and switching to a system bandwidth to measure a downlink reference signal, and entering the narrow bandwidth reception mode again.

In S303, the terminal is scheduled to switch to a system bandwidth to measure the downlink reference signal according to the measurement parameters.

Figure 4:
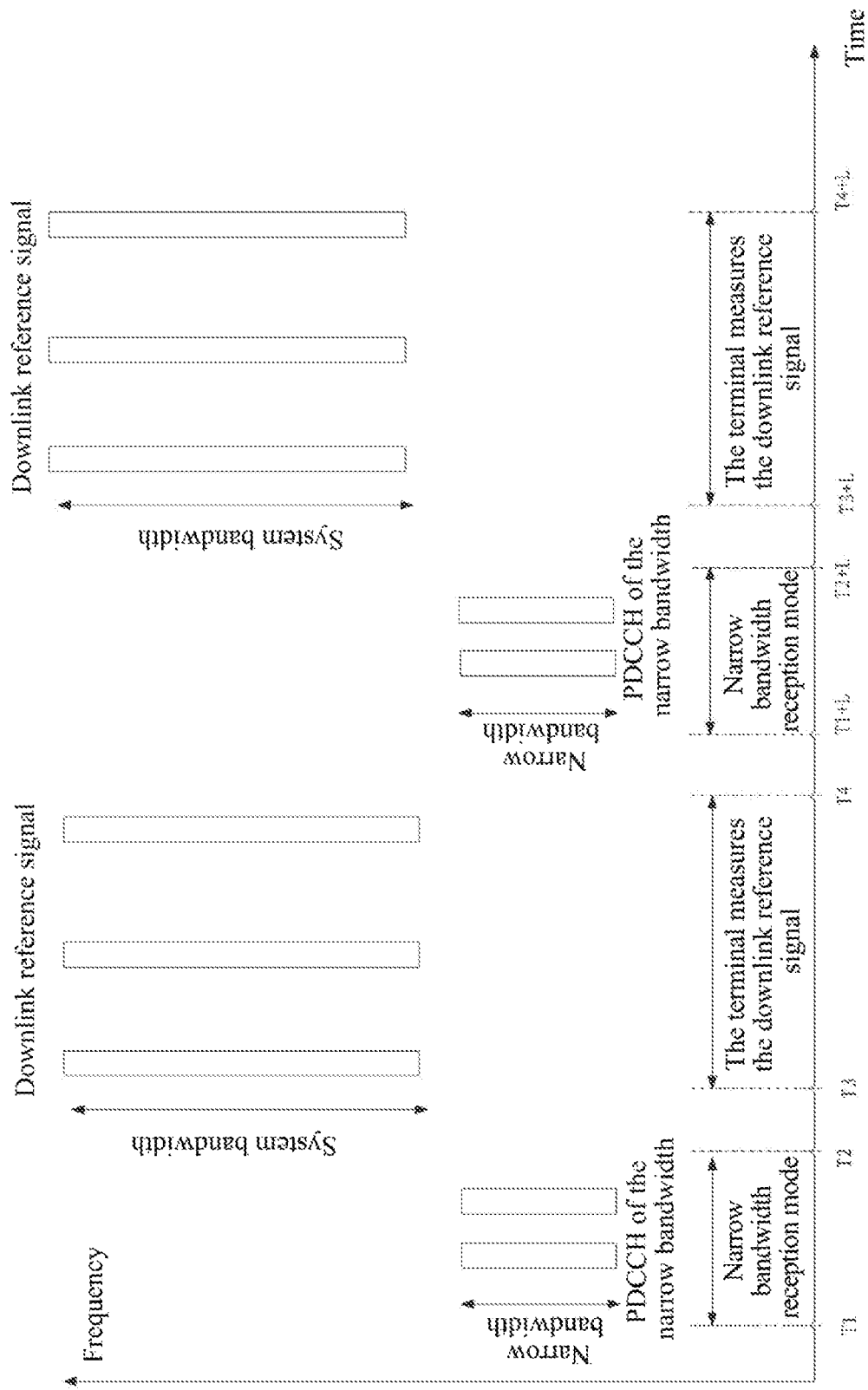
FIG. 4 is a schematic diagram of measuring a downlink reference signal by using the method shown in FIG. 3 according to an implementation of the present disclosure.

Referring to FIG. 4, which is a schematic diagram of measuring the downlink reference signal by using the method shown in FIG. 3 according to the implementation of the present disclosure, wherein the base station may configure the cycle for measuring the downlink reference signal and information of the time period for measuring the downlink reference signal in the cycle. For example, T1~T1+L is a complete cycle, and T3~T4 is the time period for measuring the downlink reference signal. Assuming that L is 14 ms and T3~T4 occupy the 5$^{th}$ ms to the 12$^{th}$ ms of the 14 ms, the base station may schedule the terminal to switch to the system bandwidth to measure the downlink reference signal in each cycle. Of course, the base station may configure information of a time period when the terminal is in a narrow bandwidth. For example, as shown in FIG. 4, the base station may configure the terminal to be in a narrow bandwidth reception mode at T1~T2 in advance, while the terminal tunes to the system bandwidth to measure the downlink reference signal at T3~T4. Then the terminal returns to the narrow bandwidth reception mode at T4~T1+L. The time of T2~T3 is a time interval reserved for the terminal to tune from the narrow bandwidth to the system bandwidth. And T4~T1+L is time reserved for the terminal to tune back to the narrow bandwidth from the system bandwidth. L is a length of the cycle for measurement.

In the implementation of the present disclosure, by being configured with a specific cycle and specific time period information, the terminal may start the measurement of CSI of the downlink channel according to the cycle when entering the narrow bandwidth mode. Overhead of signaling of the base station may be saved. Of course, in another implementation, after the base station has configured the measurement parameters, the terminal may not perform measurement immediately according to the measurement parameters after entering the narrow bandwidth reception mode, but may wait for a trigger of the base station.

Figure 5:
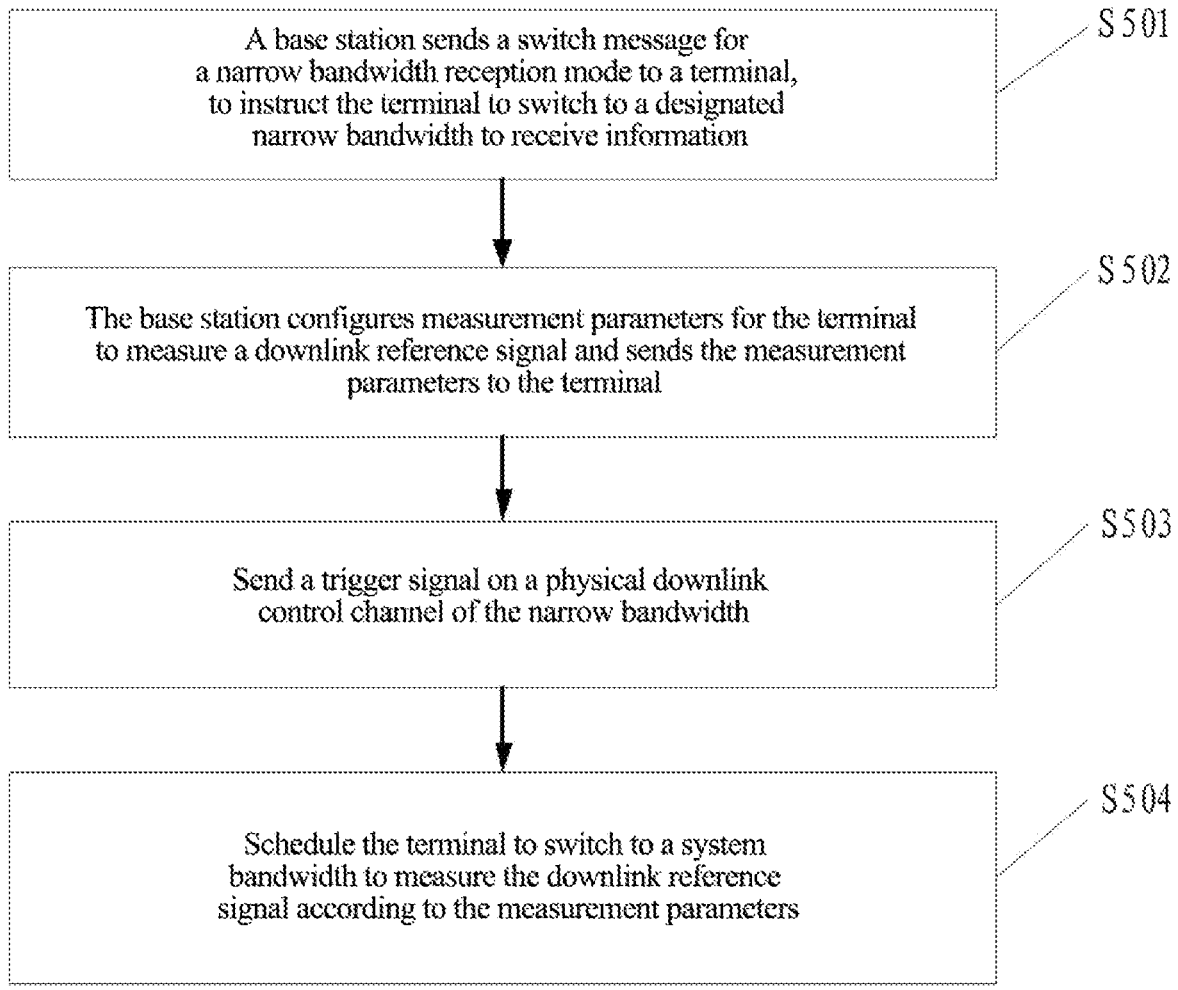
FIG. 5 is a flow chart of a third implementation of the measurement method of the present disclosure.

Referring to FIG. 5, which is a flow chart of a third implementation of the measurement method of the present disclosure. In this implementation, acts S501-S502 are the same as acts S301-S302 in FIG. 3, and act S504 and act S303 are the same. Before act S504, act S503 is further included.

In S503, a trigger signal is sent on a physical downlink control channel of the narrow bandwidth.

The trigger signal is used for triggering the terminal to switch to a system bandwidth to measure a downlink reference signal according to the measurement parameters.

Optionally, the base station may trigger the terminal to start measuring by using signals on a PDCCH of the narrow bandwidth, such as several bits in DCI, and the terminal will start measuring according to the method as shown in FIG. 4 after receiving the trigger signal.

Scheduling the terminal for measurement through a triggered manner may improve a flexibility of scheduling the terminal by the base station to perform measurement.

Figure 6:
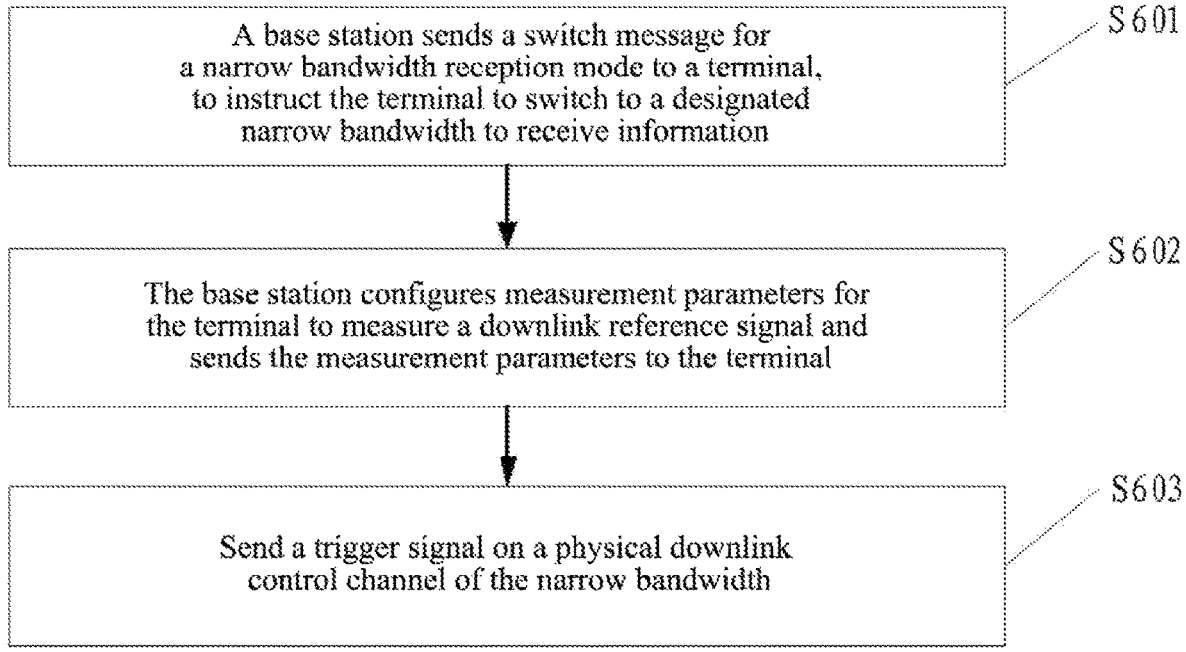
FIG. 6 is a flow chart of a fourth implementation of the measurement method of the present disclosure.

Referring to FIG. 6, which is a flow chart of a fourth implementation of the measurement method of the present disclosure. In this implementation, the method includes acts S601-S603.

In S601, a base station sends a switch message for a narrow bandwidth reception mode to a terminal, to instruct the terminal to switch to a designated narrow bandwidth to receive information.

In S602, the base station configures measurement parameters for the terminal to measure a downlink reference signal and sends the measurement parameters to the terminal.

The measurement parameters include a duration for the terminal to measure the downlink reference signal for one time.

In S603, a trigger signal is sent on a physical downlink control channel of the narrow bandwidth.

The trigger signal is used for triggering the terminal to switch to a system bandwidth to measure a downlink reference signal according to the measurement parameters.

In this implementation, the base station directly configures a duration of the measurement of the terminal and informs the terminal, wherein the duration is the duration of T3-T4 in FIG. 4, and schedules the terminal for measurement through a triggered manner, which may further improve the flexibility of scheduling the terminal for measurement. Since the base station only configures a duration of a single measurement, a duration of the narrow bandwidth reception mode at each time may be different. When the terminal is triggered to perform measurement in the narrow bandwidth reception mode, the terminal performs a single measurement according to the duration of the single measurement. After the single measurement is completed, a measurement may be carried out according to a predetermined cycle, or a single trigger may be carried out next time. In addition, a configuration mode of the trigger signal may be the same as that of the implementation shown in FIG. 5, which is not repeated here.

It should be noted that, the implementations of the measurement method shown in FIGS. 2-6 may be implemented independently or in combination with each other, and the implementations of the present disclosure are not limited thereto. And in the implementation shown in FIGS. 3-6, the measurement parameters configured by the base station for the terminal may include at least two different configurations. When the measurement parameters are sent to the terminal, configuration situations of the measurement parameters are indicated to the terminal through a physical downlink control channel of the narrow bandwidth;

The base station may modify currently used measurement parameters in a measurement process. The base station instructs the terminal to use measurement parameters of another configuration for measurement through the physical downlink control channel of the narrow bandwidth if the currently used measurement parameters need to be modified.

For example, the base station preconfigures three sets of parameters with different configurations. The base station first uses the PDCCH of the narrow bandwidth to trigger the terminal to start measurement according to parameters configured in a first set. At a later time, the base station may use the PDCCH of the narrow bandwidth to instruct the terminal to start measurement according to parameters configured in a second or third set.

In addition, when the terminal measures the downlink reference signal in the system bandwidth, it may only receive and measure the downlink reference signal without detecting a PDCCH of the system bandwidth, thus saving an energy consumption of the terminal.

And for the implementations shown in FIGS. 2-6, after the terminal measures the downlink reference signal to obtain CSI of a downlink channel, the base station may receive channel state information of the downlink channel reported by the terminal; send a message for stopping measurement to the terminal to instruct the terminal to stop measuring the downlink reference signal.

The terminal may report the measured result to the base station, for example, through Uplink Control Information (UCI) transmitted on a Physical Uplink Control Channel (PUCCH) or a Physical Uplink Shared Channel (PUSCH).

In the implementations, the base station may trigger the terminal to stop measuring the downlink reference signal through DCI on the PDCCH of the narrow bandwidth. After the base station obtains the CSI of the downlink channel reported by the terminal, the base station may temporarily stop the terminal to measure the downlink reference signal. The base station may trigger the terminal to start measuring the downlink reference signal again at a later time.

Figure 7:
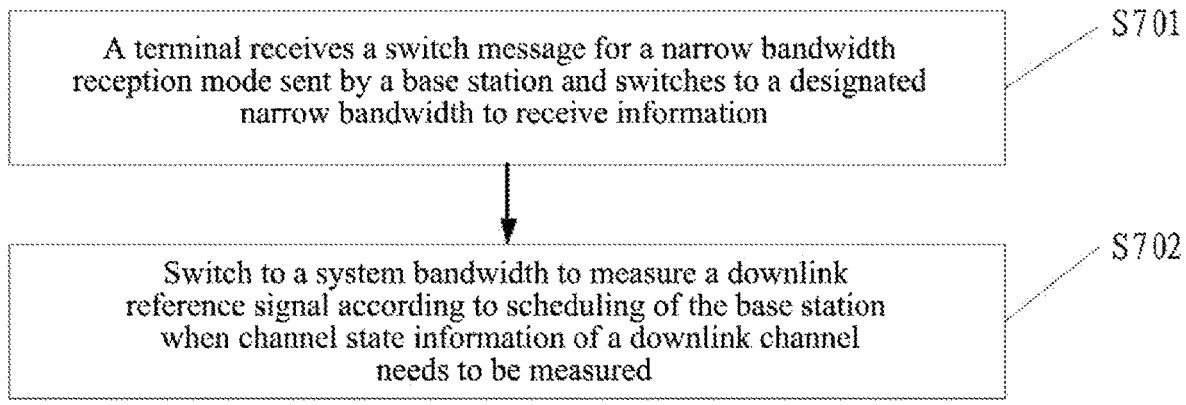
FIG. 7 is a flow chart of a fifth implementation of the measurement method of the present disclosure.

Referring to FIG. 7, which is a flow chart of a fifth implementation of the measurement method of the present disclosure. In this implementation, the measurement method includes acts S701-S702.

In S701, a terminal receives a switch message for a narrow bandwidth reception mode sent by a base station and switches to a designated narrow bandwidth to receive information.

A width of the narrow bandwidth is less than a width of a system bandwidth. The switch message includes indication of time at which the terminal enters the narrow bandwidth reception mode and a position of the narrow bandwidth on a frequency band when entering the narrow bandwidth reception mode.

Optionally, the terminal may receive downlink control information for the terminal in a physical downlink control channel on the narrow bandwidth.

The downlink control information is in a terminal specific search space corresponding to the terminal and uses a control channel element aggregation level corresponding to the terminal.

In S702, a system bandwidth is switched to for measuring a downlink reference signal according to scheduling of the base station when channel state information of a downlink channel needs to be measured.

FIG. 7 is an illustration of an implementation of the terminal side, and a specific process may refer to the description of the implementation of the base station side shown in FIG. 2, which is not repeated here.

Figure 8:
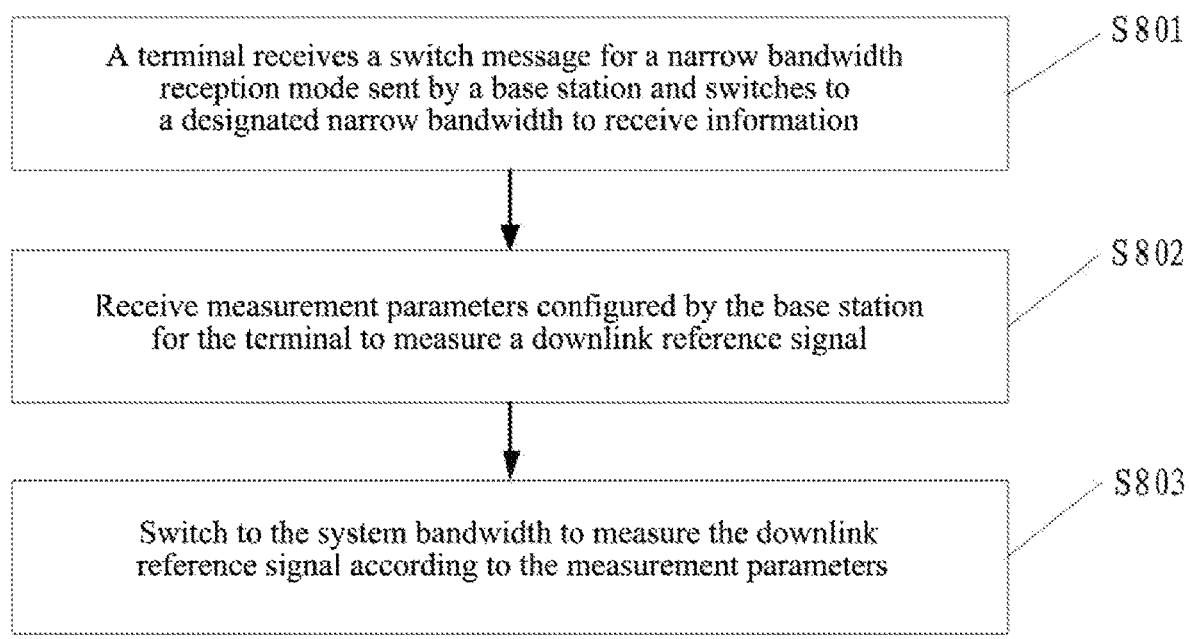
FIG. 8 is a flow chart of a sixth implementation of the measurement method of the present disclosure.

Referring to FIG. 8, which is a flow chart of a sixth implementation of the measurement method of the present disclosure. In this implementation, the measurement method includes acts S801-S803.

In S801, a terminal receives a switch message for a narrow bandwidth reception mode sent by a base station and switches to a designated narrow bandwidth to receive information.

In S802, measurement parameters configured by the base station for the terminal to measure a downlink reference signal are received.

The measurement parameters include a cycle for the terminal to measure the downlink reference signal and information of a time period for the terminal to measure the downlink reference signal in the cycle; wherein the cycle includes a duration for the terminal to enter the narrow bandwidth reception mode, switch to a system bandwidth to measure the downlink reference signal, and enter the narrow bandwidth reception mode again.

In S803, the system bandwidth is switched to for measuring the downlink reference signal according to the measurement parameters.

Optionally, before switching to the system bandwidth to measure the downlink reference signal according to the measurement parameters, the method may further include: receiving a trigger signal sent by the base station on a physical downlink control channel of the narrow bandwidth, wherein the trigger signal is used for triggering the terminal to switch to the system bandwidth to measure the downlink reference signal according to the measurement parameters.

FIG. 8 is an illustration of an implementation of the terminal side, and a specific process may refer to the description of the implementation of the base station side shown in FIGS. 3-5, which will not be repeated here.

Figure 9:
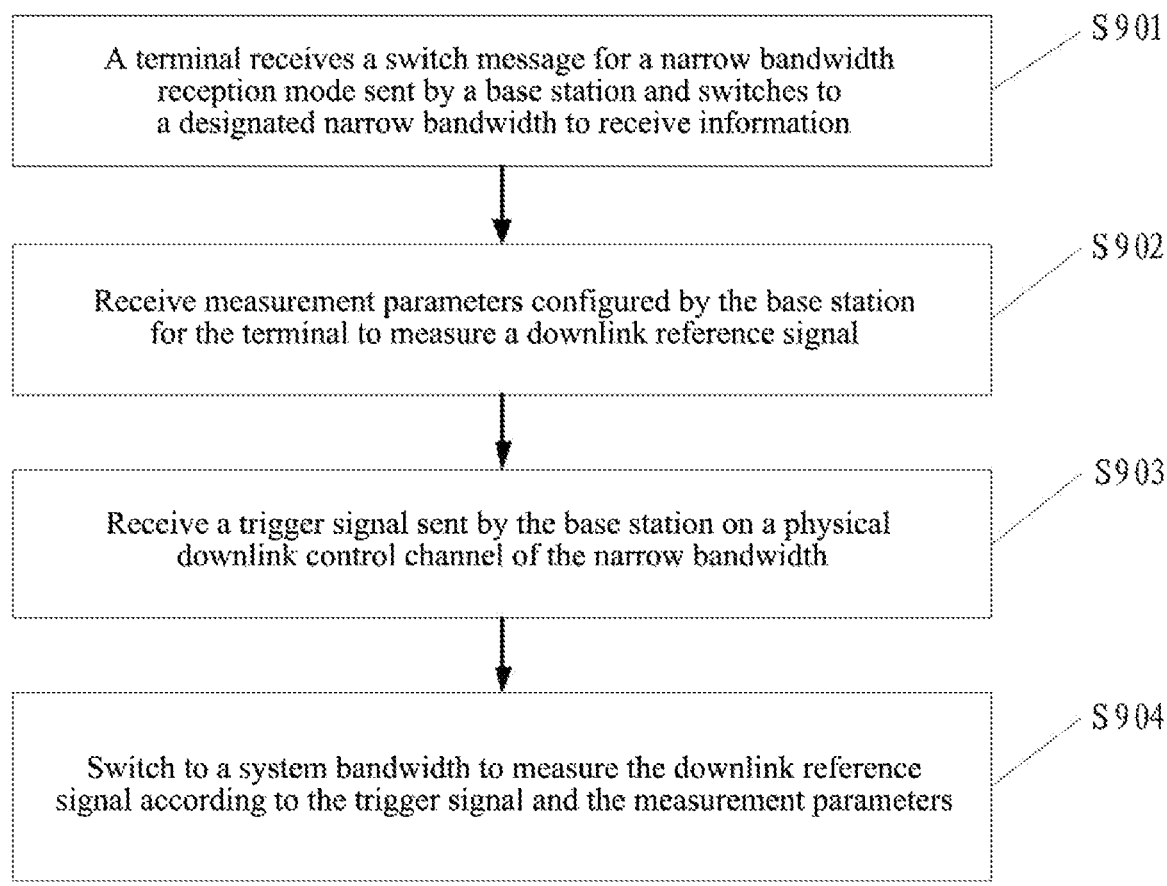
FIG. 9 is a flow chart of a seventh implementation of the measurement method of the present disclosure.

Referring to FIG. 9, which is a flow chart of a seventh implementation of the measurement method of the present disclosure. In this implementation, the measurement method includes acts S901-S904.

In S901, a terminal receives a switch message for a narrow bandwidth reception mode sent by a base station and switches to a designated narrow bandwidth to receive information.

In S902, measurement parameters configured by the base station for the terminal to measure a downlink reference signal are received.

The measurement parameters include a duration for the terminal to measure the downlink reference signal for one time.

In S903, a trigger signal sent by the base station on a physical downlink control channel of the narrow bandwidth is received.

In S904, a system bandwidth is switched to for measuring the downlink reference signal according to the trigger signal and the measurement parameters.

Optionally, in the implementations shown in FIGS. 8-9, the measurement method may further include that: the measurement parameters configured by the base station for the terminal include at least two different configurations, and when receiving the measurement parameters, configuration situations of the measurement parameters are determined through an indication on a physical downlink control channel of the narrow bandwidth; and information is received, which is sent by the base station through the physical downlink control channel of the narrow bandwidth, which instructs the terminal to use measurement parameters of another configuration for measurement if the base station needs to modify currently used measurement parameters.

Optionally, in the implementations shown in FIGS. 7-9, the measurement method may further include: reporting the channel state information of the downlink channel to the base station; and receiving a message for stopping measurement sent by the base station, and stopping measuring the downlink reference signal.

FIG. 9 is an illustration of an implementation of the terminal side, and a specific process may refer to the description of the implementation of the base station side shown in FIG. 6, which will not be repeated here.

Figure 10:
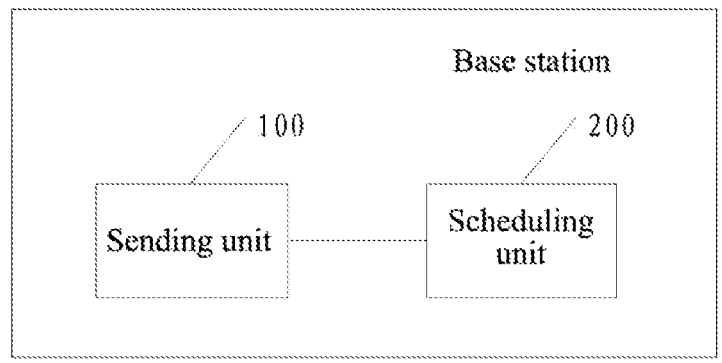
FIG. 10 is a schematic diagram of components in a first implementation of the base station of the present disclosure.

Referring to FIG. 10, which is a schematic diagram of components in a first implementation of the base station of the present disclosure. In the implementation, the base station includes a sending unit 100 and a scheduling unit 200.

The sending unit 100 is used for sending a switch message for a narrow bandwidth reception mode to a terminal, to instruct the terminal to switch to a designated narrow bandwidth to receive information, wherein a width of the narrow bandwidth is less than a width of a system bandwidth.

The scheduling unit 200 is used for scheduling the terminal to switch to the system bandwidth to measure a downlink reference signal when channel state information of a downlink channel needs to be measured.

Optionally, the sending unit 100 is further used for sending downlink control information for the terminal in a physical downlink control channel on the narrow bandwidth.

The downlink control information is in a terminal specific search space corresponding to the terminal and uses a control channel element aggregation level corresponding to the terminal.

Optionally, the scheduling unit 200 is specifically used for: configuring measurement parameters for the terminal to measure the downlink reference signal and sending the measurement parameters to the terminal, wherein the measurement parameters include a cycle for the terminal to measure the downlink reference signal and information of a time period for the terminal to measure the downlink reference signal in the cycle; wherein the cycle includes a duration for the terminal to enter the narrow bandwidth reception mode, switch to a system bandwidth to measure the downlink reference signal, and enter the narrow bandwidth reception mode again; and scheduling the terminal to switch to the system bandwidth to measure the downlink reference signal according to the measurement parameters.

Optionally, before scheduling the terminal to switch to the system bandwidth to measure the downlink reference signal according to the measurement parameters, the sending unit 100 is further used for sending a trigger signal on a physical downlink control channel of the narrow bandwidth, wherein the trigger signal is used for triggering the terminal to switch to the system bandwidth to measure the downlink reference signal according to the measurement parameters.

Optionally, the scheduling unit 200 is specifically used for: configuring measurement parameters for the terminal to measure the downlink reference signal and sending the measurement parameters to the terminal, wherein the measurement parameters include a duration for the terminal to measure the downlink reference signal for one time; and sending a trigger signal on a physical downlink control channel of the narrow bandwidth, wherein the trigger signal is used for triggering the terminal to switch to the system bandwidth to measure the downlink reference signal according to the measurement parameters.

Optionally, the measurement parameters configured by the base station for the terminal include at least two different configurations, and the sending unit 100 is further used for indicating configuration situations of the measurement parameters to the terminal through a physical downlink control channel of the narrow bandwidth when sending the measurement parameters to the terminal; and the scheduling unit 200 is further used for instructing the terminal to use measurement parameters of another configuration for measurement through the physical downlink control channel of the narrow bandwidth if currently used measurement parameters need to be modified.

Optionally, the scheduling unit 200 is further used for receiving the channel state information of the downlink channel reported by the terminal; and sending a message for stopping measurement to the terminal to instruct the terminal to stop measuring the downlink reference signal.

Figure 11:
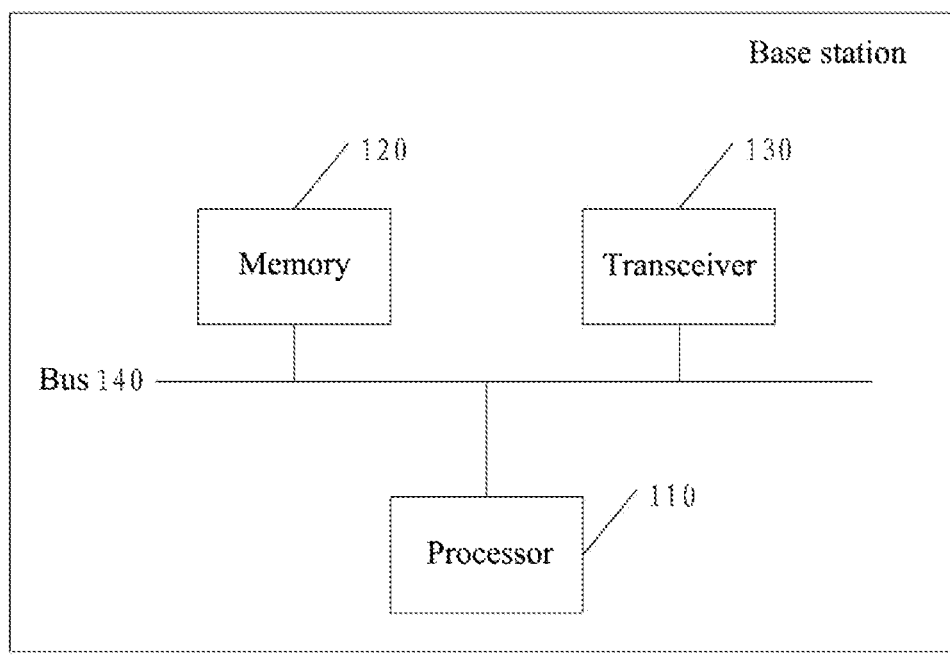
FIG. 11 is a schematic diagram of components in a second implementation of the base station of the present disclosure.

Referring to FIG. 11, which is a schematic diagram of components in a second implementation of the base station of the present disclosure. In the implementation, the base station includes:

a processor 110, a memory 120, a transceiver 130 and a bus 140, wherein the processor 110, the memory 120, and the transceiver 130 are connected through the bus 140, wherein the transceiver 130 is used for transmitting and receiving signals and communicating with a terminal, and the memory 120 is used for storing a group of program codes, and the processor 110 is used for calling the program codes stored in the memory 120 to perform the following operations: sending a switch message for a narrow bandwidth reception mode to a terminal through the transceiver 130, to instruct the terminal to switch to a specified narrow bandwidth to receive information, wherein a width of the narrow bandwidth is less than a width of a system bandwidth; and scheduling, by the base station, the terminal to switch to the system bandwidth to measure a downlink reference signal when channel state information of a downlink channel needs to be measured.

Optionally, the processor 110 is further used for sending, through the transceiver 130, downlink control information for the terminal in a physical downlink control channel on the narrow bandwidth.

The downlink control information is in a terminal specific search space corresponding to the terminal and uses a control channel element aggregation level corresponding to the terminal.

Optionally, the processor 110 is specifically used for configuring measurement parameters for the terminal to measure the downlink reference signal and sending the measurement parameters to the terminal, wherein the measurement parameters include a cycle for the terminal to measure the downlink reference signal and information of a time period for the terminal to measure the downlink reference signal in the cycle; wherein the cycle includes a duration for the terminal to enter the narrow bandwidth reception mode, switch to a system bandwidth to measure the downlink reference signal, and enter the narrow bandwidth reception mode again; and scheduling the terminal to switch to the system bandwidth to measure the downlink reference signal according to the measurement parameters.

Optionally, before scheduling the terminal to switch to the system bandwidth to measure the downlink reference signal according to the measurement parameters, the processor 110 is further used for: sending a trigger signal, through the transceiver 130, on a physical downlink control channel of the narrow bandwidth, wherein the trigger signal is used for triggering the terminal to switch to the system bandwidth to measure the downlink reference signal according to the measurement parameters.

Optionally, the processor 110 is specifically used for configuring measurement parameters for the terminal to measure the downlink reference signal and sending the measurement parameters to the terminal, wherein the measurement parameters include a duration for the terminal to measure the downlink reference signal for one time; and sending a trigger signal on a physical downlink control channel of the narrow bandwidth, wherein the trigger signal is used for triggering the terminal to switch to the system bandwidth to measure the downlink reference signal according to the measurement parameters.

Optionally, the measurement parameters configured by the base station for the terminal include at least two different configurations, and the processor 110 is further used for indicating configuration situations of the measurement parameters to the terminal through a physical downlink control channel of the narrow bandwidth when sending the measurement parameters to the terminal.

The processor 110 is further used for instructing the terminal to use measurement parameters of another configuration for measurement through the physical downlink control channel of the narrow bandwidth if currently used measurement parameters need to be modified.

Optionally, the processor 110 is further used for receiving, through the transceiver 130, the channel state information of the downlink channel reported by the terminal; and sending a message for stopping measurement to the terminal to instruct the terminal to stop measuring the downlink reference signal.

Figure 12:
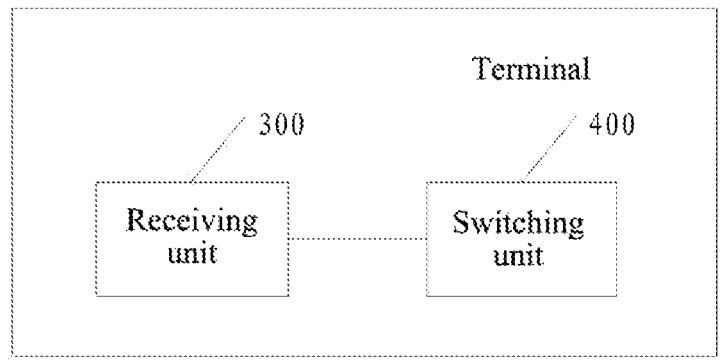
FIG. 12 is a schematic diagram of components in a first implementation of the terminal of the present disclosure.

Referring to FIG. 12, which is a schematic diagram of components in a first implementation of the terminal of the present disclosure. In the implementation, the terminal includes a receiving unit 300 and a switching unit 400.

The receiving unit 300 is used for receiving a switch message for a narrow bandwidth reception mode sent by a base station and switching to a designated narrow bandwidth to receive information, wherein a width of the narrow bandwidth is less than a width of a system bandwidth.

The switching unit 400 is used for switching to the system bandwidth to measure a downlink reference signal according to scheduling of the base station when channel state information of a downlink channel needs to be measured.

Optionally, the receiving unit 300 is further used for receiving downlink control information for the terminal in a physical downlink control channel on the narrow bandwidth.

The downlink control information is in a terminal specific search space corresponding to the terminal and uses a control channel element aggregation level corresponding to the terminal.

Optionally, the receiving unit 300 is specifically used for receiving measurement parameters configured by the base station for the terminal to measure the downlink reference signal, wherein the measurement parameters include a cycle for the terminal to measure the downlink reference signal and information of a time period for the terminal to measure the downlink reference signal in the cycle; wherein the cycle includes a duration for the terminal to enter the narrow bandwidth reception mode, switch to a system bandwidth to measure the downlink reference signal, and enter the narrow bandwidth reception mode again.

The switching unit 400 is specifically used for: switching to the system bandwidth to measure the downlink reference signal according to the measurement parameters.

Optionally, before the switching unit 400 switches to the system bandwidth to measure the downlink reference signal according to the measurement parameters, the receiving unit 300 is further used for: receiving a trigger signal sent by the base station on a physical downlink control channel of the narrow bandwidth, wherein the trigger signal is used for triggering the terminal to switch to the system bandwidth to measure the downlink reference signal according to the measurement parameters.

Optionally, the receiving unit 300 is specifically used for: receiving measurement parameters configured by the base station for the terminal to measure the downlink reference signal, wherein the measurement parameters include a duration for the terminal to measure the downlink reference signal for one time; receiving a trigger signal sent by the base station on a physical downlink control channel of the narrow bandwidth.

The switching unit 400 is specifically used for: switching to the system bandwidth to measure the downlink reference signal according to the trigger signal and the measurement parameters.

Optionally, the measurement parameters configured by the base station for the terminal include at least two different configurations, and when the receiving unit 300 receives the measurement parameters, the switching unit 400 is further used for determining configuration situations of the measurement parameters through an indication on a physical downlink control channel of the narrow bandwidth; if the base station needs to modify currently used measurement parameters, the receiving unit 300 is further used for receiving information, which is sent by the base station through the physical downlink control channel of the narrow bandwidth, instructing the terminal to use measurement parameters of another configuration for measurement.

Optionally, the switching unit 400 is further used for reporting the channel state information of the downlink channel to the base station; receiving a message for stopping measurement sent by the base station, and stopping measuring the downlink reference signal.

Figure 13:
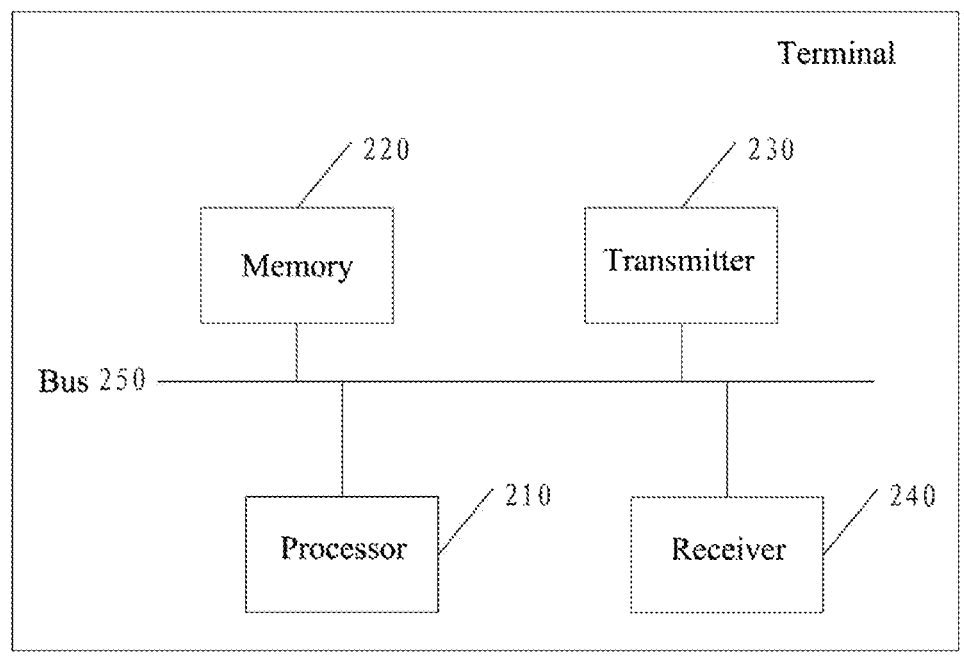
FIG. 13 is a schematic diagram of components in a second implementation of the terminal of the present disclosure.

Referring to FIG. 13, which is a schematic diagram of components in a second implementation of the terminal of the present disclosure. In the implementation, the terminal includes: a processor 210, a memory 220, a transmitter 230, a receiver 240 and a bus 250, wherein the processor 210, the memory 220, the transmitter 230, and the receiver 240 are connected through the bus 250, wherein the transmitter 230 is used for transmitting signals, and the receiver 240 is used for receiving signals, and the transmitter 230 and the receiver 240 are independently respectively set or integrated, and the memory 220 is used for storing a group of program codes, and the processor 210 is used for calling the program codes stored in the memory 220 to perform the following operations: receiving, through the receiver 240, a switch message for a narrow bandwidth reception mode sent by a base station, and switching to a designated narrow bandwidth to receive information, wherein a width of the narrow bandwidth is less than a width of a system bandwidth; and switching to the system bandwidth to measure a downlink reference signal according to scheduling of the base station when channel state information of a downlink channel needs to be measured.

Optionally, the processor 210 is further used for receiving, through the receiver 240, downlink control information for the terminal in a physical downlink control channel on the narrow bandwidth.

The downlink control information is in a terminal specific search space corresponding to the terminal and uses a control channel element aggregation level corresponding to the terminal.

Optionally, the processor 210 is specifically used for receiving measurement parameters configured by the base station for the terminal to measure the downlink reference signal through the receiver 240, wherein the measurement parameters include a cycle for the terminal to measure the downlink reference signal and information of a time period for the terminal to measure the downlink reference signal in the cycle; wherein the cycle includes a duration for the terminal to enter the narrow bandwidth reception mode, switch to a system bandwidth to measure the downlink reference signal, and enter the narrow bandwidth reception mode again; and switching to the system bandwidth to measure the downlink reference signal according to the measurement parameters.

Optionally, the processor 210 is further used for receiving, through the receiver 240, a trigger signal sent by the base station on a physical downlink control channel of the narrow bandwidth before switching to the system bandwidth to measure the downlink reference signal according to the measurement parameters, wherein the trigger signal is used for triggering the terminal to switch to the system bandwidth to measure the downlink reference signal according to the measurement parameters.

Optionally, the processor 210 is specifically used for: receiving, through the receiver 240, measurement parameters configured by the base station for the terminal to measure the downlink reference signal, wherein the measurement parameters include a duration for the terminal to measure the downlink reference signal for one time; receiving, through the receiver 240, a trigger signal sent by the base station on a physical downlink control channel of the narrow bandwidth; and switching to the system bandwidth to measure the downlink reference signal according to the trigger signal and the measurement parameters.

Optionally, the measurement parameters configured by the base station for the terminal include at least two different configurations, and the processor 210 is further used for determining configuration situations of the measurement parameters through an indication on a physical downlink control channel of the narrow bandwidth when receiving the measurement parameters; if the base station needs to modify currently used measurement parameters, the processor 210 is further used for receiving, through the receiver 240, information, which is sent by the base station through the physical downlink control channel of the narrow bandwidth, instructing the terminal to use measurement parameters of another configuration for measurement.

Optionally, the processor 210 is further used for reporting the channel state information of the downlink channel to the base station through the transmitter 230; receiving a message for stopping measurement sent by the base station through the receiver 240, and stopping measuring the downlink reference signal.

The base station described in the implementation may be used to implement some or all of the processes in the method implementations described in connection with FIGS. 2-6 of the present disclosure and perform some or all of the functions in the apparatus implementation described in connection with FIG. 10 of the present disclosure. The terminal described in the implementation may be used to implement some or all of the processes in the method implementations described in connection with FIGS. 7-9 of the present disclosure and perform some or all of the functions in the apparatus implementation described in connection with FIG. 12 of the present disclosure, which will not be repeated here.

In one or more examples, the described functions may be implemented in hardware, software, firmware, or any combination thereof. If implemented in software, the functions may be stored on or transmitted via a computer readable medium as one or more instructions or codes and executed through a hardware-based processing unit. The computer readable medium may include a computer readable storage medium (which corresponds to a tangible medium such as a data storage medium) or a communication medium, and the communication medium includes, for example, any medium that facilitates transferring of a computer program from one place to another according to a communication protocol. In this way, the computer readable medium may generally correspond to (1) a non-transitory tangible computer readable storage medium, or (2) a communication medium such as a signal or carrier. The data storage medium may be any available medium accessible by one or more computers or one or more processors to retrieve instructions, codes, and/or data structures for implementing the techniques described in the present disclosure. The computer program product may include a computer readable medium.

By way of examples, but not limitations, some computer readable storage medium may include RAM, ROM, EEPROM, CD-ROM or other optical disk memory, magnetic disk memory or other magnetic storage device, Flash memory, or any other medium that may be used to store desired program codes in a form of instructions or data structures and that may be accessed by a computer. Moreover, any connection may be appropriately referred to as a computer readable medium. For example, if instructions are sent from a website, server, or other remote source using a coaxial cable, fiber optic cable, twisted pair, digital subscriber line (DSL), or wireless technologies (e.g., infrared, radio, or microwave), then the coaxial cable, fiber optic cable, twisted pair, DSL, or wireless technologies (e.g., infrared, radio, or microwave) are included in the definition of medium. However, it should be understood that the computer readable storage medium and data storage medium do not include connections, carriers, signals, or other transitory medium, but rather relate to non-transitory tangible storage medium. As used herein, magnetic disks and optical disks include compact disks (CD), laser disks, optical disks, digital video disks (DVD), floppy disks, and Blue-ray disks, wherein magnetic disks usually reproduce data magnetically, while optical disks reproduce data optically by laser. Combinations of the above objects should be included within the scope of the computer readable medium.

The instructions may be executed by one or more processors such as one or more digital signal processors (DSP), general purpose microprocessors, application specific integrated circuits (ASIC), field programmable gate arrays (FPGA) or other equivalent integrated or discrete logic circuits. Thus, the term "processor" as used herein may refer to any of the foregoing structures or any other structure suitable for implementing the techniques described herein. In addition, in some aspects, the functionality described herein may be provided within dedicated hardware and/or software modules configured for encoding and decoding, or incorporated into a combined codec. Moreover, the techniques may be fully implemented in one or more circuits or logic elements.

The techniques of the present disclosure may be widely implemented by a variety of apparatuses or devices including wireless handsets, integrated circuits (IC) or IC sets (e.g., chipsets). Various components, modules or units are described in the present disclosure to emphasize functional aspects of apparatuses configured to perform the disclosed techniques, but are not necessarily required to be implemented by different hardware units. Specifically, as described above, various units may be combined in a hardware unit of a codec, or provided by a collection of interoperable hardware units (including one or more processors as described above) in combination with suitable software and/or firmware.

It should be understood that the "one implementation" or "an implementation" in the specification means that particular features, structures, or characteristics related to the implementations may be included in at least one implementation of the present disclosure. Thus, "in one implementation" or "in an implementation" in the specification may not definitely refer to the same implementation. In addition, the particular features, structures, or characteristics may be combined in any suitable manner in one or more implementations.

It shall also be understood that, in various implementations of the present disclosure, values of sequence numbers of the above-mentioned processes do not indicate an order of execution, and the order of execution of various processes should be determined by their functions and internal logics, and should not constitute any limitation on the execution process of the implementations of the present disclosure.

In addition, the terms "system" and "network" are often used interchangeably herein. The term "and/or" in this document is merely an association relationship describing associated objects, indicating that there may be three relationships, for example, A and/or B may indicate three situations: A alone, A and B, and B alone. In addition, the symbol "I" in this document generally indicates that objects of the former and the latter connected by "I" has an "or" relationship.

In the implementation provided in the present disclosure, it should be understood that "B corresponding to A" means that B is associated with A, and B may be determined according to A. However, it should be further understood that determining B according to A does not mean B is determined according to A only, and B may be determined according to A and/or other information.

Those of ordinary skill in the art will recognize that various exemplary units and algorithm acts described in connection with the implementations disclosed herein can be implemented in electronic hardware, or computer software or a combination of computer software and electronic hardware. In order to explain interchangeability of software and hardware clearly, the composition of the examples and the acts in the examples are described generally with respect to functions in the above description. Whether these functions are implemented in hardware or software depends on the specific application and design constraints of the technical solution. Skilled in the art may use different methods to realize the described functions for each particular application, but such realization should not be considered to be beyond the scope of the present disclosure.

Those skilled in the art may clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed systems, apparatuses and methods may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

What are described above are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be determined by the protection scope of the appended claims.

The invention claimed is:

1. A measurement method, comprising:
sending, by a base station, a switch message for a narrow bandwidth reception mode to a terminal to instruct the terminal to switch to a designated narrow bandwidth to receive information, wherein a width of the narrow bandwidth is less than a width of a system bandwidth; and
scheduling, by the base station, the terminal to switch to the system bandwidth to measure a downlink reference signal transmitted by the base station over the system bandwidth when channel state information of a downlink channel of the system bandwidth needs to be measured;
wherein scheduling, by the base station, the terminal to switch to the system bandwidth to measure the downlink reference signal transmitted by the base station over the system bandwidth when the channel state information of the downlink channel of the system bandwidth needs to be measured, comprises:
configuring, by the base station, measurement parameters for the terminal to measure the downlink reference signal and sending the measurement parameters to the terminal, wherein the measurement parameters comprise a cycle for the terminal to measure the downlink reference signal transmitted by the base station over the system bandwidth and information of a time period for the terminal to measure the downlink reference signal in the cycle; and
scheduling the terminal to switch to the system bandwidth to measure the downlink reference signal according to the measurement parameters.

2. The measurement method of claim 1, wherein the measurement method further comprises:
sending downlink control information for the terminal in a physical downlink control channel on the narrow bandwidth;
wherein the downlink control information is in a terminal specific search space corresponding to the terminal and uses a control channel element aggregation level corresponding to the terminal.

3. The measurement method of claim 1,
wherein the cycle comprises a duration for the terminal to enter the narrow bandwidth reception mode, switch to the system bandwidth to measure the downlink reference signal, and enter the narrow bandwidth reception mode again.

4. The measurement method of claim 1, wherein the measurement method further comprises:
before scheduling the terminal to switch to the system bandwidth to measure the downlink reference signal according to the measurement parameters:
sending a trigger signal on a physical downlink control channel of the narrow bandwidth, wherein the trigger signal is used for triggering the terminal to switch to the system bandwidth to measure the downlink reference signal according to the measurement parameters.

5. The measurement method of claim 1, wherein the measurement parameters configured by the base station for the terminal comprise at least two different configurations, and when the measurement parameters are sent to the terminal, configuration situations of the measurement parameters are indicated to the terminal through a physical downlink control channel of the narrow bandwidth; and
the base station instructs the terminal to use measurement parameters of another configuration for measurement through the physical downlink control channel of the narrow bandwidth based on a determination that currently used measurement parameters need to be modified.

6. A measurement method, comprising:
receiving, by a terminal, a switch message for a narrow bandwidth reception mode sent by a base station and switching to a designated narrow bandwidth to receive information, wherein a width of the narrow bandwidth is less than a width of a system bandwidth; and
switching to the system bandwidth to measure a downlink reference signal transmitted by the base station over the system bandwidth according to scheduling of the base station when channel state information of a downlink channel of the system bandwidth needs to be measured;
wherein switching to the system bandwidth to measure the downlink reference signal transmitted by the base station over the system bandwidth according to the scheduling of the base station when the channel state information of the downlink channel of the system bandwidth needs to be measured, comprises:
receiving measurement parameters configured by the base station for the terminal to measure the downlink reference signal, wherein the measurement parameters comprise a cycle for the terminal to measure the downlink reference signal transmitted by the base station over the system bandwidth and information of a time period for the terminal to measure the downlink reference signal in the cycle; and
switching to the system bandwidth to measure the downlink reference signal according to the measurement parameters.

7. The measurement method of claim 6, wherein the measurement method further comprises:
receiving downlink control information for the terminal in a physical downlink control channel on the narrow bandwidth;
wherein the downlink control information is in a terminal specific search space corresponding to the terminal and uses a control channel element aggregation level corresponding to the terminal.

8. The measurement method of claim 6,
wherein the cycle comprises a duration for the terminal to enter the narrow bandwidth reception mode, switch to the system bandwidth to measure the downlink reference signal, and enter the narrow bandwidth reception mode again.

9. The measurement method of claim 6, wherein the method further comprises:
before switching to the system bandwidth to measure the downlink reference signal according to the measurement parameters:
receiving a trigger signal sent by the base station on a physical downlink control channel of the narrow bandwidth, wherein the trigger signal is used for triggering the terminal to switch to the system bandwidth to measure the downlink reference signal according to the measurement parameters.

10. The measurement method of claim 6, wherein the measurement parameters configured by the base station for the terminal comprise at least two different configurations, and when receiving the measurement parameters, configuration situations of the measurement parameters are determined through an indication on a physical downlink control channel of the narrow bandwidth; and
information, which is sent by the base station through the physical downlink control channel of the narrow bandwidth, instructing the terminal to use measurement parameters of another configuration for measurement is received based on a determination that the base station needs to modify currently used measurement parameters.

11. A base station, comprising:
a processor, a memory, a transceiver, and a bus, wherein the processor, the memory and the transceiver are connected through the bus, and the transceiver is used for receiving and transmitting signals and communicating with a terminal, and the memory is used for storing a group of program codes, and the processor is used for calling the program codes stored in the memory to perform the following operations:
sending a switch message for a narrow bandwidth reception mode to a terminal through the transceiver to instruct the terminal to switch to a specified narrow bandwidth to receive information, wherein a width of the narrow bandwidth is less than a width of a system bandwidth; and
scheduling the terminal to switch to the system bandwidth to measure a downlink reference signal transmitted by the base station over the system bandwidth when channel state information of a downlink channel of the system bandwidth needs to be measured;
wherein the processor is specifically used for configuring measurement parameters for the terminal to measure the downlink reference signal and sending the measurement parameters to the terminal, wherein the measurement parameters comprise a cycle for the terminal to measure the downlink reference signal transmitted by the base station over the system bandwidth and information of a time period for the terminal to measure the downlink reference signal in the cycle; and
scheduling the terminal to switch to the system bandwidth to measure the downlink reference signal according to the measurement parameters.

12. The base station of claim 11, wherein the processor is further used for sending downlink control information for the terminal through the transceiver in a physical downlink control channel on the narrow bandwidth;

wherein the downlink control information is in a terminal specific search space corresponding to the terminal and uses a control channel element aggregation level corresponding to the terminal.

13. The base station of claim 11, wherein the cycle comprises a duration for the terminal to enter the narrow bandwidth reception mode, switch to the system bandwidth to measure the downlink reference signal, and enter the narrow bandwidth reception mode again.

14. The base station of claim 11, wherein the processor is further used for:

before scheduling the terminal to switch to the system bandwidth to measure the downlink reference signal according to the measurement parameters:

sending a trigger signal through the transceiver on a physical downlink control channel of the narrow bandwidth, wherein the trigger signal is used for triggering the terminal to switch to the system bandwidth to measure the downlink reference signal according to the measurement parameters.

15. The base station of claim 11, wherein the measurement parameters configured by the base station for the terminal comprise at least two different configurations, and the processor is further used for indicating configuration situations of the measurement parameters to the terminal through a physical downlink control channel of the narrow bandwidth when sending the measurement parameters to the terminal; and the processor is further used for instructing the terminal to use measurement parameters of another configuration for measurement through the physical downlink control channel of the narrow bandwidth based on a determination that currently used measurement parameters need to be modified.

16. A terminal device, comprising:

a processor, a memory, a transmitter, a receiver, and a bus, wherein the processor, the memory, the transmitter, and the receiver are connected through the bus, wherein the transmitter is used for transmitting signals, and the receiver is used for receiving signals, and the transmitter and the receiver are independently respectively configured or integrated, and the memory is used for storing a group of program codes, and the processor is used for calling the program codes stored in the memory to perform the following operations:

receiving a switch message for a narrow bandwidth reception mode sent by a base station through the receiver, and switching to a designated narrow bandwidth to receive information, wherein a width of the narrow bandwidth is less than a width of a system bandwidth; and switching to the system bandwidth to measure a downlink reference signal transmitted by the base station over the system bandwidth according to scheduling of the base station when channel state information of a downlink channel of the system bandwidth needs to be measured;

wherein the processor is specifically used for receiving, through the receiver, measurement parameters configured by the base station for the terminal to measure the downlink reference signal, wherein the measurement parameters comprise a cycle for the terminal to measure the downlink reference signal transmitted by the base station over the system bandwidth and information of a time period for the terminal to measure the downlink reference signal in the cycle; and switching to the system bandwidth to measure the downlink reference signal according to the measurement parameters.

17. The terminal of claim 16, wherein the processor is further used for receiving, through the receiver, downlink control information for the terminal in a physical downlink control channel on the narrow bandwidth;

wherein the downlink control information is in a terminal specific search space corresponding to the terminal and uses a control channel element aggregation level corresponding to the terminal.

18. The terminal of claim 16, wherein the cycle comprises a duration for the terminal to enter the narrow bandwidth reception mode, switch to the system bandwidth to measure the downlink reference signal, and enter the narrow bandwidth reception mode again.

19. The terminal of claim 16, wherein the processor is further used for receiving, through the receiver, a trigger signal sent by the base station on a physical downlink control channel of the narrow bandwidth before switching to the system bandwidth to measure the downlink reference signal according to the measurement parameters, wherein the trigger signal is used for triggering the terminal to switch to the system bandwidth to measure the downlink reference signal according to the measurement parameters.

20. The terminal of claim 16, wherein the measurement parameters configured by the base station for the terminal comprise at least two different configurations, and the processor is further used for determining configuration situations of the measurement parameters through an indication on a physical downlink control channel of the narrow bandwidth when receiving the measurement parameters; and based on a determination that the base station needs to modify currently used measurement parameters, the processor is further used for receiving, through the receiver, information, which is sent by the base station through the physical downlink control channel of the narrow bandwidth, instructing the terminal to use measurement parameters of another configuration for measurement.

* * * * *